Patented Nov. 19, 1946

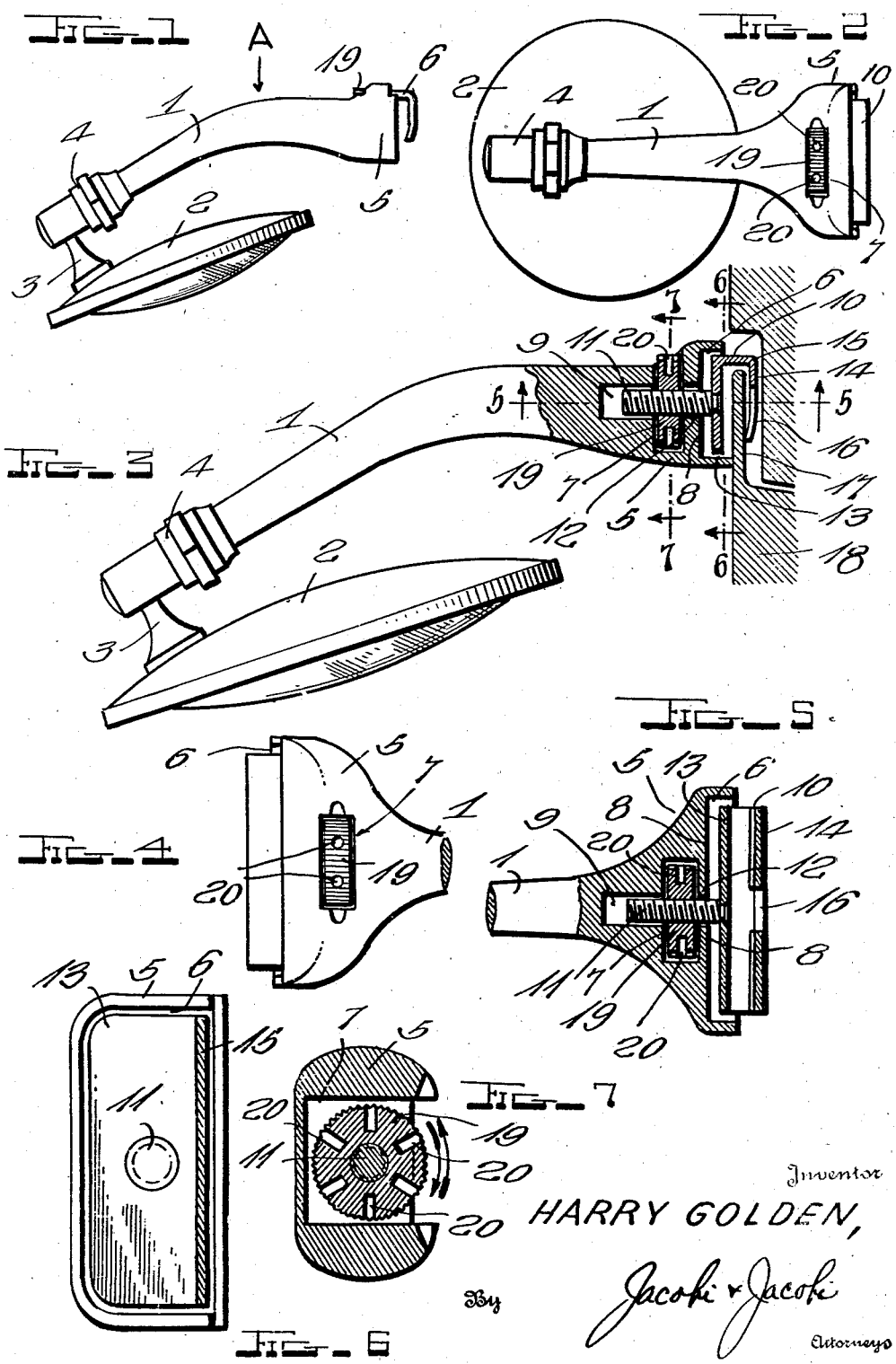

2,411,421

UNITED STATES PATENT OFFICE 2,411,421

AUTO MIRROR BRACKET

Harry Golden, New York, N. Y.

Application October 25, 1945, Serial No. 624,531

4 Claims. (Cl. 248—226)

This invention relates to a rear view mirror of the type used upon automobiles, and more particularly to a bracket for such mirror having improved means for holding the same in engagement with the door of the automobile.

One object of the invention is to provide the bracket of a rear view mirror with a clamp so constructed and so mounted that it may be very readily applied to the flange of the door of an automobile and then adjusted so that the clamp will have firm gripping engagement with the flange of the door and securely retain the bracket in a set position.

Another object of the invention is to provide the bracket with a clamp having a threaded stem which fits into a socket formed in a foot of the bracket and carrying a nut which is accessible through an opening formed in a side of the foot, whereby the nut may be readily turned by the thumb or finger to partially tighten the clamp and then further engaged by a tool for imparting additional turns to the nut to complete the tightening of said clamp.

A still further object of the invention resides in providing a simple, durable and efficient mirror bracket which may be quickly and readily applied to use, adjusted or removed as desired.

With these and numerous other objects in view, my invention exists in the novel features of construction, combination and arrangement of parts as will be hereinafter reported to you and more particularly pointed out in the specification and claims.

In the accompanying drawing, forming a part of this application

Figure 1 is a top plan view of the improved rear view mirror.

Figure 2 is a rear view of the mirror looking in the direction of the arrow A in Figure 1.

Figure 3 is an enlarged view showing the improved rear view mirror partially in top plan and partially in longitudinal section.

Figure 4 is a rear view of the inner end portion of the bracket of the mirror.

Figure 5 is a sectional view taken along the line 5—5 of Figure 3.

Figure 6 is a sectional view taken along the line 6—6 of Figure 3.

Figure 7 is a sectional view taken along the line 7—7 of Figure 3.

This improved rear view mirror has a bracket 1 formed of strong light metal and curved as shown in Figures 1 and 3 so that when it is applied to the door of an automobile it will, for a portion of its length, extend outwardly from the automobile at a rearward incline. The mirror 2 has a stem 3 engaged with a coupling 4 at the outer end of the bracket 1, the coupling being so formed that the mirror may be tilted in various directions and disposed in such angular relation to the automobile that the driver may obtain a clear view of other automobiles approaching from the rear.

At its inner end the bracket is enlarged to form a foot 5 which is of appreciably greater width than the bracket and formed at its end with a pocket 6 of rectangular outline. This pocket 6 is separated from a pocket 7 by a wall or partition 8 and outwardly of the pocket 7 there has been formed a socket 9 extending longitudinally of the bracket. A clamp 10 fits into the pocket 6 and carries a threaded stem 11 which passes through an opening 12 formed in wall 8 and also passes through the pocket 7 and into the socket 9. The clamp is formed of rigid metal and is of U-shaped formation when viewed as shown in Figure 3. Therefore the clamp has inner and outer flanges 13 and 14 connected by a bridge portion 15, the outer flange being formed intermediate its length with a recess 16. The space between the flanges 13 and 14 is such that the marginal flange 17 of an automobile door 18 may be very easily engaged between the flanges of the clamp, and the clamp thus disposed in straddling engagement with the flange of the door and the inner end of the bracket disposed in position to bear against the outer surface of the door flange, as shown in Figure 3. A nut 19 which fits into the pocket 7 is threaded upon the stem 11, and this nut is of such diameter that it projects through the open outer end of the pocket, so that the milled edge of said nut may be engaged with the thumb or finger and said nut turned to shift the clamp longitudinally of the bracket and cause the flange of the door to be firmly gripped between the inner end or foot of the bracket and the flange 14 of the clamp. After the clamp has been tightened as much as may be conveniently done with the thumb or finger, a metal tool may be successively engaged in sockets 20 formed in the circumference of the nut and turning of the nut continued until the bracket and the clamp have such gripping engagement with the door flange that the bracket will be very firmly held in engagement with said door. When it is desired to remove the rear view mirror or shift it vertically along the door to a position in which the driver may more conveniently look at the mirror it is merely necessary to loosen the nut and the binding grip upon the door will be relieved so that the mirror may be shifted vertically and the nut retightened.

From the foregoing description of the construction of my improved rear view mirror and bracket, the method of assembling same and operation thereof will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. In a rear view mirror, a bracket having an enlarged inner end portion forming a foot, said foot having a pocket at its outer end divided from an inner pocket by a wall formed with an opening, the inner pocket being open at one side, said foot being also formed with a longitudinally extending socket communicating with the inner pocket and aligned with the opening in the wall, a clamp movable into and out of the outer pocket, said clamp being U-shaped in cross section to provide a bridge and inner and outer flanges, a threaded stem extending from the inner flange of said clamp through the opening in the wall and through the inner pocket into said socket, and a nut threaded upon said stem, said nut being disposed within the inner pocket and having a marginal portion projecting through the side opening of the pocket, the marginal edge face of the nut being milled and there being sockets leading from the marginal edge face of the nut in spaced relation to each other circumferentially thereof.

2. A bracket for a rear view mirror, said bracket being curved longitudinally and having its inner end portion enlarged to form a foot of appreciably greater width than the thickness of the bracket, the foot being formed with an outer pocket leading from the end of the foot and an inner pocket separated from the outer pocket by a wall formed with an opening, the inner pocket being open along one side, said bracket being formed with a socket leading from the inner pocket, a clamp movable into and out of the outer pocket and formed with a flange for engaging a portion of a door disposed between the inner end of the bracket and the flange of said clamp, and a nut threaded upon a stem of said clamp and disposed in the inner pocket with a portion protruding from the side thereof.

3. A bracket for a rear view mirror having an inner end formed with a foot, the foot being formed with an outer pocket and with an inner pocket and with a socket leading from the inner pocket, the inner pocket being open at one side, a clamp received in said outer pocket and having a portion for engaging a door, a threaded stem extending from said clamp through the inner pocket and into said socket, and a nut threaded upon said stem and located in the inner pocket with a marginal portion protruding from the open side of the inner pocket.

4. A bracket for a rear view mirror having an inner end formed with an outer pocket and with an inner pocket separated from the outer pocket by a partition formed with an opening, a clamp fitting within the outer pocket and having a portion for engaging a door flange disposed between the said portion of the clamp and the inner end of the bracket, a threaded stem extending from said clamp to the opening in the wall and into the inner pocket, and a nut threaded upon said stem and having a portion protruding from the open side of the inner pocket.

HARRY GOLDEN.